Dec. 16, 1969   W. T. LINK ET AL   3,484,643
BORON CARBIDE CATHODE FOR COLD EMISSION TYPE
CATHODE OF THE FIELD EMISSION TYPE
Filed Dec. 1, 1966

*INVENTOR.*
WILLIAM T. LINK
WILLIAM C. OLANDER
BY
ATTORNEYS

United States Patent Office 3,484,643
Patented Dec. 16, 1969

3,484,643
BORON CARBIDE CATHODE FOR COLD EMISSION TYPE CATHODE OF THE FIELD EMISSION TYPE
William T. Link, Berkeley, and William C. Olander, Fremont, Calif., assignors to Physics International Company, Berkeley, Calif., a corporation of California
Filed Dec. 1, 1966, Ser. No. 598,354
Int. Cl. H01j 1/02
U.S. Cl. 313—309                5 Claims

ABSTRACT OF THE DISCLOSURE

A field emitter cathode for a field emitter tube is provided wherein the cathode is completely made of a resistive material such as boron carbide.

---

The cathode of a field emitter tube is made of a resistive material such as boron carbide.

In the operation of a field emitter tube a high voltage pulse is applied between a cold cathode and an anode, of sufficient amplitude to exceed the work function of the cathode material and to cause electrons to be emitted from the cathode to the anode. Electron beam tubes of this type find use principally as high voltage X-ray generators.

It has been found that the electron beam produced from metallic cathodes of various shapes has a very poor "shot-to-shot" reproducibility. It is believed that the reason for this is that the electrons are probably emitted from one or a few locations only on the cathode, and since, as a result of ion back bombardment, the surface of a metallic cathode is changed from shot to shot, the emission at each shot changes.

An object of this invention is the provision of a cathode for a field emitter type tube wherein the emission is substantially constant.

Another object of this invention is the provision of a cathode for a field emitter tube, wherein the emission pattern is substantially reproducable.

Still another object of the present invention is the provision of a novel and efficient cathode for a field emitter tube.

These and other objects of the invention may be achieved by providing a field emitter cathode wherein the cathode is made of a resistive material. By way of illustration and not as a limitation on the invention, one suitable material is boron carbide. While the exact reasons why a cathode in accordance with this invention operates to produce repeatable results for each shot is not precisely known, the best explanation is that the tendency of a greater emission from one portion of the cathode than from another is overcome by virtue of the fact that the IR voltage drop increases as the emission from a portion of the cathode increases. As a result, by virtue of making the cathode resistive, a situation is provided analagous to a plurality of parallel connected resistors, whereby the same amount of current flows through each of them in response to a voltage applied across all of them.

The novel features that are considered characteristic of this invention are set forth with particularlity in the appended claims. The invention itself, both as to its organization and method of operation, as well as additional objects and advantages thereof, will best be understood from the following description, when read in connection with the accompanying drawings, in which:

Figure 1:
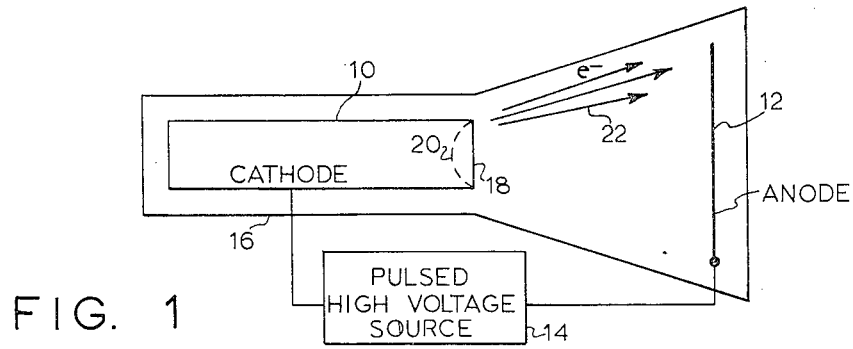
FIGURE 1 is a schematic representation of a field emitter cathode and anode in accordance with the prior art.

Referring now to FIGURE 1, there is shown a "cookie cutter" type of cathode 10, spaced from an anode 12. A pulsed high voltage source 14 applies a high voltage pulse between the cathode and anode when it is desired to cause electrons to be emitted from the cathode to the anode. Usually, the anode and cathode are enclosed in an envelope 16 and the space within the envelope is evacuated. The reason the cathode is designated as a "cookie cutter" cathode is because the surface 18 which is opposite the anode has a concave arcuate portion removed therefrom as represented by the dotted line 20.

Upon the application of a high voltage pulse, the cathode emits electrons from one or a few locations on the surface adjacent the anode. The arrows 22, represent the probable electron emission from the cathode. The "shot-to-shot" reproducibility of the electron emission pattern is extremely poor with this type of a cathode.

Figure 2:
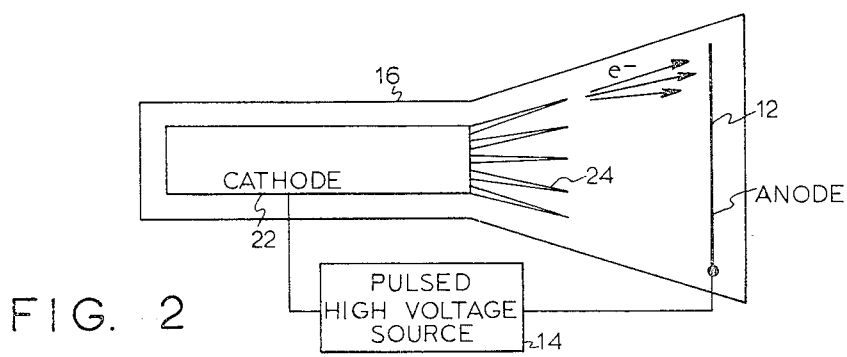
FIGURE 2 is an illustration of a "pin cushion" type of field emitter cathode and anode.

FIGURE 2 shows another type of cathode, 22, which is presently employed, which is known as the "pin cushion tip" cathode. Here there are effectively one or more needle points 24 positioned at the end of the cathode 22 which is opposite the anode 12. The emission usually takes place from one or more of the needle points. However, since there are no strong constraints to force the emission to be evenly distributed around all of the points again, it does happen that the emission occurs from entirely one point. This one point wears out rapidly.

Figure 3:
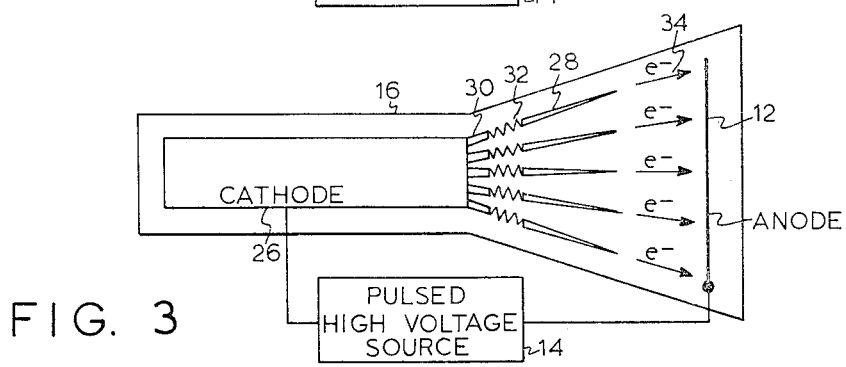
FIGURE 3 is a schematic representation of a modification of the pin cathode of a field emitter tube in accordance with this invention.

FIGURE 3 is a schematic representation of an embodiment of this invention. Here, the cathode 26 has a plurality of needle points 28, except that between each needle point and an extension 30 from the end of the cathode, there is connected a resistor 32. Now, upon the application of a high voltage pulse from the source 14, if the entire emission begins from one needle, a large IR voltage drop will apply to the tip of the needle, and this will provide a strong enducement for neighboring needles to share the emission. As a result, it is believed that the emission is shared between all of the needle points as represented by the arrows 34, because this is the only way in which the IR drop is equalized.

Figure 4:
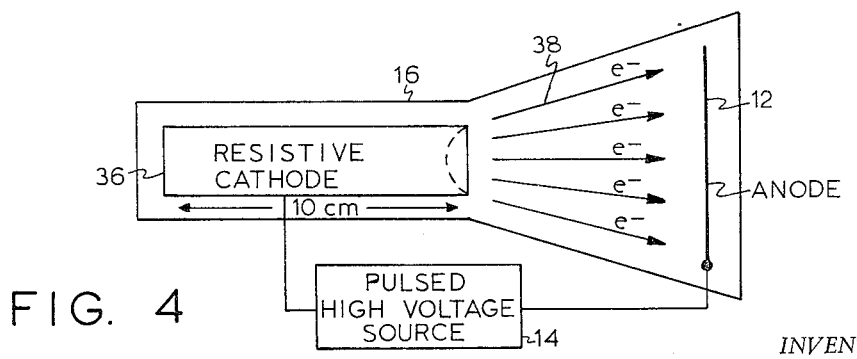
FIGURE 4 is a schematic representation of a field emitter cathode and anode in accordance with this invention.

FIGURE 4 shows a preferred arrangement for a field emitter cathode, in accordance with this invention. The shape of the cathode will be the same as the one shown in FIGURE 1. However, the cathode, instead of being made of conductive material, is made of a resistive material. A material which is suitable is, by way of example, boron carbide ($B_4C$). Using a resistive cathode 36, the emission is now uniform around the rim of the cathode, as represented by the arrows 38. The effective uniform cathode emission is to ensure that the center of gravity of the electron beam coincides with the center line of the cathode, and this ensures that all shots are accurately aimed.

The maximum permissable resistance of the cathode can be estimated from the energy deposited in the cathode for one shot, which must not melt the cathode, or the voltage drop across the cathode, which should not exceed a reasonable fraction of the total voltage available (10% for example), will be exceeded.

By way of example of the dimensions of a resistive field emitter cathode, used in an embodiment of this invention, which was successfully operated, a boron carbide cathode had an axial length of 10 centimeters and a diameter of 2 centimeters. It operated uniformly and satisfactorily as described above. Other carbides or semiconducting materials, and indeed any material with a specific resistivity above 0.001 ohm centimeter and below 1000 ohm centimeters may be considered for cathodes in accordance with this invention. However, as pointed out previously, the resistance of the cathode should not be such as to cause the cathode to melt or to cause the voltage drop across the cathode to exceed a reasonable fraction of the total voltage available.

There has accordingly been described a novel, useful field emitter cathode which provides both uniformity and predictability in operation.

What is claimed is:

1. A cathode for a field emitter tube entirely comprised of a body of boron carbide having a specific resistivity above 0.001 ohm centimeter.

2. A cathode as recited in claim 1 wherein the specific resistivity of said body is below 1000 ohm centimeters.

3. In a field emitter tube of the type having an anode and a cathode spaced therefrom for emitting electrons in response to a voltage pulse at said anode the improvement comprising a resistive cathode made entirely of boron carbide for emitting electrons substantially uniformly from the surfaces of said cathode closest to said anode.

4. In a field emitter tube as recited in claim 3 wherein said resistive cathode specific resistivity is in the range between 0.001 ohm centimeter and 1000 ohm centimeters.

5. A cathode as recited in claim 3 wherein said resistive cathode terminates at the end closest to said anode in a plurality of points.

References Cited

UNITED STATES PATENTS

| | | | |
|---|---|---|---|
| 2,232,083 | 2/1941 | Strohfeldt | 313—107 X |
| 1,596,747 | 8/1926 | Lorenz | 313—211 X |
| 2,040,752 | 5/1936 | McIlvaine | 313—211 X |
| 2,654,045 | 9/1953 | Wright | 313—211 X |
| 3,259,773 | 7/1966 | Dyke et al. | 313—309 X |
| 3,259,782 | 7/1966 | Shroff | 313—336 |

JAMES W. LAWRENCE, Primary Examiner

C. R. CAMPBELL, Assistant Examiner

U.S. Cl. X.R.

313—55, 311, 336, 351